Figure 1:
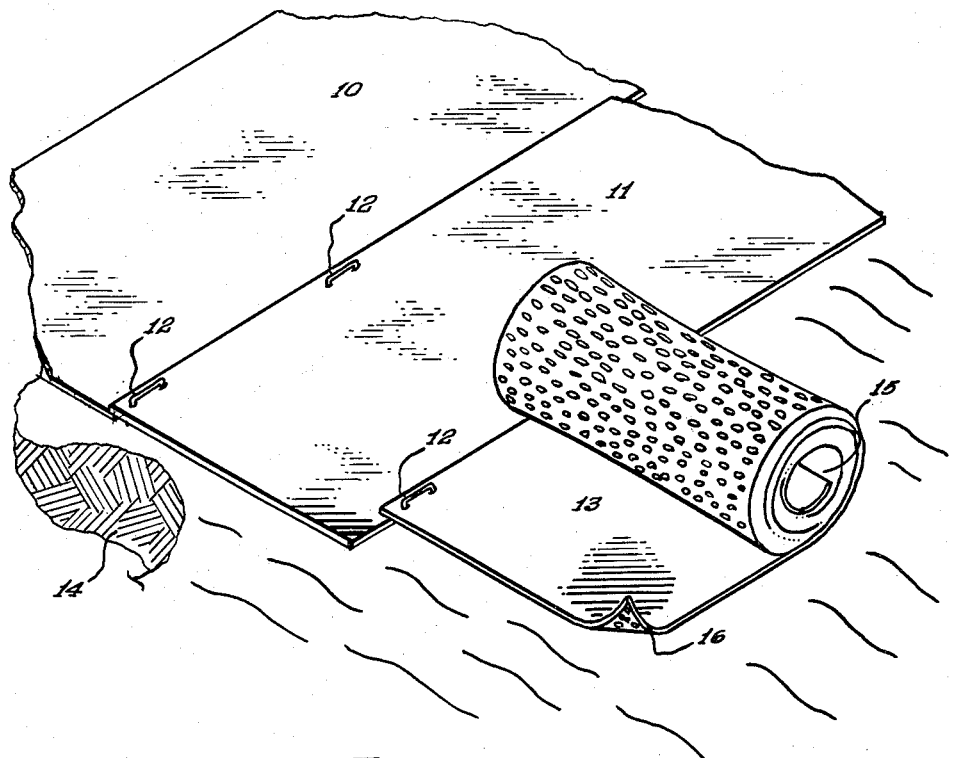

Dec. 15, 1964     J. R. WATSON ETAL     3,160,986

SEED PLANTING METHOD AND APPARATUS FOR ITS PRACTICE

Filed Oct. 18, 1960

*INVENTOR.*
JAMES R. WATSON
DAVID M. LILLY
ELMER S. CONOVER
BY
THEIR ATTORNEY 3,160,986
SEED PLANTING METHOD AND APPARATUS
FOR ITS PRACTICE
James R. Watson, Minneapolis, David M. Lilly, St. Paul, and Elmer S. Conover, Minneapolis, Minn., assignors to Toro Manufacturing Corporation, Minneapolis, Minn., a corporation of Minnesota
Filed Oct. 18, 1960, Ser. No. 63,346
4 Claims. (Cl. 47—56)

This invention pertains in general to the growth of plants from seed, and more specifically, to a method and apparatus for growing grass from seed.

The growing of grass from seed has proven to be very troublesome, particularly for the inexperienced person. The conventional planting method has been to distribute seed, according to some predetermined pattern, over soil that has been raked smooth after tilling, rake the seed in, firm the seeded soil with a roller, and then water regularly until the seed germinates and the grass plant begins to grow. The resultant germination conditions are often very poor, with the soil either being too dry or too wet most of the time, and even when great effort is made to keep the ground evenly moist at all times, the percentage of growth from viable seed is very low, averaging approximately 50%. The person doing the planting tries to overcome this low growth percentage by scattering an excessive amount of seed in a given area, with a resultant increase in cost.

Unsuccessful efforts have been made to overcome these problems. Several companies have marketed seed carriers of one type or another primarily of the type wherein commercial seed is evenly distributed in or upon a porous sheet material, and this is spread upon prepared ground. The problem of using an excessive quantity of seed is solved by being able to control the distribution of the seed on the carrier. However, these carriers are porous, and tend to dry out as an unprotected seed bed unless regularly watered, and they fail to trap moisture that has evaporated from the soil. Thus, these devices have produced no significant increase in the germination percentage. Furthermore, the seed carrier must be regularly watered to prevent the seed from drying out, and this continues to be one of the most troublesome problems in the growth of grass from seed.

Another problems that continues to be very troublesome is the susceptibility of seed to mechanical damage and erosion. When conventional seeding methods are used, in intense rain storm will wash or erode the seeded area leaving the seed bed in generally poor condition, often with deep gullies. This results in large bare areas, and isolated areas of seed concentration, rather than the desired even distribution of seed over the entire area. Furthermore, birds are prone to eat the exposed seed, while children and pets scatter it around.

Thus, in spite of extensive efforts to simplify and optimize the art of growing grass or other plants from seed, little progress has been made. Our invention discloses a method of growing plants from seed, whereby moisture evaporating from the surface of the ground is utilized to maintain almost ideal germination conditions throughout the period of germination, resulting in an appreciably higher percentage of germination of the viable seed, while maintaining positive protection against mechanical damage and erosion, and eliminating the need to water or otherwise care for the seed throughout the germination and initial growing periods.

Thus, it is a primary object of our invention to provide an improved method for growing plants from seed, providing mechanical protection for the seed bed and eliminating the need for watering or other care.

Another object of our invention is to provide an improved seed carrier for practicing this method, which is effective to utilize moisture evaporating from the earth and provide improved germination conditions for the seed.

Figure 2:
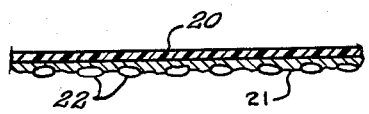
Figure 3:
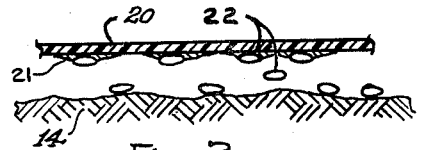
Figure 4:
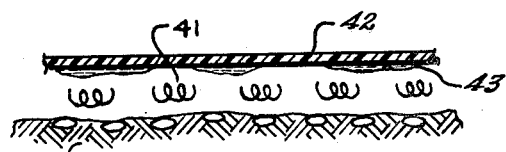

These and other objects of our invention will become apparent from the following description of a preferred form thereof, and the single sheet of drawings illustrating the form, in which:

FIGURE 1 is a perspective view of our seed carrier being rolled over the ground, FIGURE 2 is a cross sectional enlarged view of a portion of the seed carrier, and FIGURES 3 and 4 are cross sectional views of a portion of the seed carrier lying adjacent to the ground, shortly after being placed on the ground, and after firming the soil, respectively.

In FIGURE 1, we have shown our improved seed carrier being rolled onto the ground. Two overlapping strips 10 and 11, are shown already on the ground, and held in place by means such as staples 12. Pegs, stones, strips of wood, nails, earth, a pressure-sensitive or other adhesive along one edge of the seed carrier, or any number of other fasteners could be used. A third strip 13 is being rolled off from roll 15 onto the prepared ground 14, a portion of which is shown in cross section. Since the seed is on the outside of the roll, it is located on the underside of the carrier when the carrier has been placed on the ground, as is seen on upturned corner 16.

The seed carrier can be best described with reference to FIGURE 2. The sheet material 20 is selected so as to be essentially moisture proof, and good success has been realized using a polythylene film, ranging in thickness from 1 to 6 mils. It should be understood that numerous other materials such as polyester films and properly treated paper could be successfully used with this process although in each case it is necessary that they be water insoluble as in the case of the polyethylene film.

We have found that the color of the film is very important to the complete germination of the seed, and to the growth of the plants after germination has occurred. When a clear material is used, exposing the seed to all of the sun's rays, germination is incomplete. However, by using a colored translucent material, total transmission of light therethrough is appreciably reduced throughout the total light spectrum, thereby causing a corresponding reduction in the total light energy beneath the material, resulting in an environment that is excellent for germination and growth. We have found that a translucent material either milky white, red, orange or yellow in color produces very satisfactory results.

The seed 22 is secured to the film 20 by means of water soluble adhesive 21, such as polyvinyl alcohol. This adhesive is preferably placed on the film in a very thin coat, and the seed 22 is then evenly distributed thereover by means of a suitable seed spreading device. When the adhesive dries, the seed carrier is ready for use and can be rolled or otherwise handled without disturbing the seed distribution. It should be understood that any water soluble substance can be used that is capable of holding the seed to the film, and in some instances, the adhesive may be applied after distributing the seed, or perhaps both before and after or co-currently, depending upon the effectiveness of the adhesive and processing equipment.

In order to cause sturdy and healthy plant growth, it may be desirable to use a combination of fungicides, fertilizers, insecticides, herbicides, and growth hormones during the manufacture of our product. This can be accomplished by using pre-treated seed, by using the adhesive as a vehicle for such materials, or by distributing such materials on the film with the seed to be held in place by the adhesive.

The process of using our seed carrier includes the steps of (1) preparing the soil, which usually includes tilling, raking and watering, and (2) placing the seed carrier, seed side down, over the prepared surface, being careful to overlap the strips similar to shingles up a hill, or lengthwise down a hill, to prevent water from flowing under the film and onto the ground causing erosion. Moisture in the ground moves upward by capillarity and evaporates at the surface, and then being unable to pass through the moisture proof film condenses on the film, and dissolves the adhesive, permitting the seed to fall. When sufficient moisture has condensed to break surface tension, the water falls to the ground, and a surfactant has been found helpful in this respect.

After the plants begin to grow, this evaporation-condensation effect is enhanced by the transpiration process. As a result, we have found that the soil below the seed carrier stays moist at all times, even when adjacent uncovered soil becomes hard and dry due to lack of rain or other moisture. The resultant highly humid condition causes the adhesive 21 to dissolve, and the seed to fall onto the moist ground as is shown in FIGURE 3, wherein some of the seed 22 is still held on the film 20 by remaining portions of adhesive 21, some is shown falling, and some is shown on the ground 14. It should be noted that any fungicides, etc., that had been used would be released onto the soil at this time, to enhance and protect the plant growth. Although a space is shown between film 20 and the surface of the ground, primarily for clarity in the illustration, it should be understood that the film is laid directly on the ground, and would ordinarily be in direct contact with at least the high spots on the ground.

At this point in the process, as an additional optional step, we have found it sometimes desirable to press the seed into the soil, by moving a heavy object such as a roller over the surface of the film after the seed has dropped off. This causes the seed to be pressed into the soil, and slightly firms the soil, thereby tending to improve the rooting process of the plant. This step is not essential to the process, but under certain conditions or on certain types of seed beds, it aids plant establishment. The result of this step is shown in FIGURE 4, where the seed is pressed into the soil 14. In FIGURE 4, we have also illustrated moisture 43 collecting on the underside of the film 42, and water vapor 41 in the space between the soil 14 and the film 42.

When growing any plant from seed, it is necessary to provide an environment that contains the necessary ingredients to maintain a physiological balance. That is, there must be sufficient oxygen in the air to permit germination of the seed, and to maintain the respiration process; and there must be sufficient carbon dioxide in the air, either from the deterioration of organic matter in the soil or otherwise, to permit the photosynthetic process that occurs after leaves emerge on the plant. In this regard, it should be noted that a gaseous exchange takes place through polyethylene, even though it is very nearly a barrier to moisture and water vapor. Thus, to the extent that there is not a physiological balance beneath the film, a gaseous transfer can occur either through the film or under the edges thereof.

After the seed has germinated, and the plants are growing, the moisture proof film can be conveniently rolled up and either destroyed or used for some other purpose. There is no need to hurry the removal of this film, particularly when suitable fungicides and insecticides have been used, because it continues to provide a favorable environment for grass growth. Furthermore, it continues to act as a positive mulch, protecting the seed and seed bed from rain, erosion, frost, and other mechanical damage. However, after the plants have formed a sufficiently strong root system to withstand exposure to the local prevailing environmental conditions, such as soil condition, terrain, climate, and weather, the film would ordinarily be removed. If our invention has been used late in the fall, it may be desirable to leave the film on the planted area to reduce the possibility of desiccation or "winter-kill" during the winter months. It should be noted that by using our process, plants can be started from seed over a greater span of time, both earlier and later than in the case of open seeding, and even at times when there is relatively little rainfall or other moisture. It can also be started in cold climates in the spring, even before the frost is out of the ground, and is effective to speed thawing of the ground. When thawing begins, a moist environment is created, the seed will fall off the film and germinate, and this would normally occur several weeks before the uncovered grass begins to grow in the immediate area, thereby providing satisfactory plant growth under the film even before conventional planting can be started.

What has been described is considered to be the preferred embodiment of our invention, but it is apparent that numerous modifications thereof are possible. Therefore, we do not wish to be limited to the form shown except as indicated by the following claims.

What is claimed is:

1. A method for planting and germinating seeds and for promoting the development of seedlings therefrom which consists in
   providing an imperforate highly flexible single ply, sheet of relatively thin, translucent, water-insoluble and substantially moisture-proof material which transmits at least a portion of the sun's rays,
   attaching a multiplicity of seeds to one surface of said sheet, through use of a water-soluble adhesive,
   then placing said seed-attached sheet directly on the surface of a prepared seed bed containing moisture with said one surface facing said seed bed, and with the opposite surface of said sheet uncovered and exposed to the sun's rays,
   said sheet being effective to cause moisture which evaporates from said seed bed to condense and create a generally uniform wetness upon said one surface and thereby gradually dissolve said adhesive and cause said seeds to be released and fall upon said seed bed,
   continuing to so expose said sheet in such relation until the seedlings have sufficiently developed beneath said sheet to withstand exposure to the prevailing environmental conditions,
   and then removing said sheet from said seed bed.

2. A method for planting and germinating seeds and for promoting the development of seedlings therefrom which consists in:
   providing an imperforate highly flexible single ply sheet of relatively thin, translucent, water-insoluble and substantially moisture-proof material which transmits at least a portion of the sun's rays,
   attaching a multiplicity of seeds to one surface of said sheet, through use of a water-soluble adhesive,
   rolling said seed-laden sheet into a compact cylindrical mass,
   then unrolling said rolled sheet directly upon the surface of a prepared seed bed containing moisture with said one surface facing said seed bed, and with the opposite surface of said sheet uncovered and exposed to the sun's rays,
   said sheet being effective to cause moisture which evaporates from said seed bed to condense and create a generally uniform wetness upon said one surface and thereby gradually dissolve said adhesive and cause said seeds to be released and fall upon said seed bed,
   continuing to so expose said sheet in such relation until the seedlings have sufficiently developed beneath said sheet to withstand exposure to the prevailing environmental conditions,
   and then removing said sheet from said seed bed.

3. An improved method for germinating seed and promoting development of the seedling therefrom, comprising the steps of:

attaching seed through use of a water-soluble substance on one side of an imperforate relatively thin, highly flexible translucent, water-insoluble, and substantially moisture-proof single ply sheet of material capable of passing at least a portion of the sun's rays, placing said seed-laden material directly on the surface of a seed bed containing moisture with said one side facing said seed bed, said substance being dissolved so to cause said seed to fall onto said seed bed, germinate, and grow, under the influence of the energy from the portion of the sun's rays passed by said material and the moisture evaporating from said seed bed, which combine to create a generally uniform wetness upon said one side whereby to dissolve said water-soluble substance and cause said seed to be released and fall upon said seed bed and to thereby create a favorable germination and growth condition between said seed bed and said material, and removing said material from said seed bed after the seedlings have become established to withstand exposure to the prevailing environmental conditions.

4. A device for planting and germinating seeds and for promoting the development of seedlings therefrom consisting of:

an elongate single ply, thin imperforate, substantially moisture-proof, water-insoluble, translucent highly flexible sheet to be laid directly upon the surface of a seed bed containing moisture, a multiplicity of seeds adhered by a water-soluble adhesive substance to the surface of said sheet which is to lie upon said seed bed, said seeds being capable of falling directly unto the seed bed when released from said sheet, the other surface of said sheet being exposed to direct action thereon by the sun's rays when said seed supporting side lies upon a seed bed.

References Cited by the Examiner

UNITED STATES PATENTS

| 1,930,939 | 10/33 | Horner | 47—9 |
| 1,971,504 | 8/34 | Pratt | 47—56 |
| 2,192,939 | 3/40 | Slayter | 47—56 X |
| 2,281,927 | 5/42 | Fischer | 47—56 |
| 2,648,165 | 8/53 | Nestor | 47—56 |
| 2,876,588 | 3/59 | Tietz | 47—56 X |
| 2,893,168 | 7/59 | Kobs. | |
| 3,080,681 | 3/63 | Merrill | 47—56 |

FOREIGN PATENTS

| 74,703 | 9/18 | Austria. |
| 191,127 | 10/07 | Germany. |
| 699,028 | 10/53 | Great Britain. |
| 552,448 | 12/56 | Italy. |

OTHER REFERENCES

Modern Plastics (Magazine) article: "Film on the Farm," in vol. 34, No. 1, pages 112–116 and 233–238, September 1956, TP 986, A1–M6.

Monsanto, Booklet "How To Use Polyethylene Film on Your Farm," published 1958 by Monsanto Chemical Co., Plastics Division, Springfield, Mass., page 15.

T. GRAHAM CRAVER, *Primary Examiner.*

A. JOSEPH GOLDBERG, ARNOLD RUEGG,
*Examiners.*